(12) United States Patent
Haila et al.

(10) Patent No.: US 9,798,703 B2
(45) Date of Patent: *Oct. 24, 2017

(54) SYSTEMS AND METHODS FOR NAVIGATING TO ERRORS IN AN XBRL DOCUMENT USING METADATA

(71) Applicant: WORKIVA INC., Ames, IA (US)

(72) Inventors: David Andrew Haila, Clive, IA (US); Jason Carl Jones, West Des Moines, IA (US); Jeffrey William Hilleman, Huxley, IA (US)

(73) Assignee: Workiva Inc., Ames, IA (US)

( * ) Notice: Subject to any disclaimer, the term of this patent is extended or adjusted under 35 U.S.C. 154(b) by 759 days.

This patent is subject to a terminal disclaimer.

(21) Appl. No.: 14/286,634

(22) Filed: May 23, 2014

(65) Prior Publication Data
US 2014/0258848 A1 Sep. 11, 2014

Related U.S. Application Data

(63) Continuation of application No. 13/829,442, filed on Mar. 14, 2013, now Pat. No. 8,739,025.
(Continued)

(51) Int. Cl.
*G06F 17/00* (2006.01)
*G06F 17/21* (2006.01)
(Continued)

(52) U.S. Cl.
CPC ........ *G06F 17/218* (2013.01); *G06F 17/2247* (2013.01); *G06F 17/2725* (2013.01)

(58) Field of Classification Search
CPC .. G06F 17/2247; G06F 17/218; G06F 17/227; G06F 17/30896; G06Q 10/10
See application file for complete search history.

(56) References Cited

U.S. PATENT DOCUMENTS 7,415,482 B2 8/2008 Blake et al.
7,472,346 B2 12/2008 Baelen
(Continued)

OTHER PUBLICATIONS

Financial Accounting Standards Board, 2011 FASB US GAAP Financial Reporting Taxonomy Release Notes, Jan. 31, 2011, 291 pages, copyright XBRL US, Inc. 2007-2010; Financial Accounting Foundation, Inc. 2010-2011.
(Continued)

*Primary Examiner* — Kyle Stork
(74) *Attorney, Agent, or Firm* — Drinker Biddle & Reath LLP

(57) ABSTRACT

An XBRL document preparation system comprises an XBRL taxonomy module including one or more XBRL taxonomies having one or more XBRL concepts; a business document editor module that facilitates tagging of one or more entries of a business document with one or more XBRL tags based on the XBRL concepts, and generating an XBRL document including XBRL code corresponding to the tagged entries of the business document; an XBRL document validation system that validates the generated XBRL document and generates at least one of validation errors and warnings corresponding to the XBRL code; an XBRL validation report processing module that associates at least one of the generated validation errors and warnings with a specific source among the tagged entries of the business document; and a user interface module that identifies and facilitates editing the specific source among the tagged entries of the business document.

20 Claims, 15 Drawing Sheets

Related U.S. Application Data

(60) Provisional application No. 61/618,419, filed on Mar. 30, 2012.

(51) Int. Cl.
   *G06F 17/22* (2006.01)
   *G06F 17/27* (2006.01)

(56) References Cited

U.S. PATENT DOCUMENTS

| | | |
|---|---|---|
| 8,099,370 B2 | 1/2012 | Ohata |
| 8,176,003 B2 | 5/2012 | Bush et al. |
| 2006/0184539 A1 | 8/2006 | Blake et al. |
| 2006/0242181 A1 | 10/2006 | Mueller-Klingspor |
| 2006/0242624 A1 | 10/2006 | Mueller-Klingspor |
| 2007/0078877 A1 | 4/2007 | Ungar et al. |
| 2007/0192265 A1* | 8/2007 | Chopin ............ G06Q 10/10 706/20 |
| 2007/0234202 A1 | 10/2007 | Lyness |
| 2008/0201157 A1 | 8/2008 | McNamar |
| 2008/0201172 A1 | 8/2008 | McNamar |
| 2008/0201319 A1 | 8/2008 | McNamar |
| 2009/0006472 A1* | 1/2009 | Bush ............ G06F 17/2247 |
| 2009/0019358 A1* | 1/2009 | Blake ............ G06F 17/2247 715/234 |
| 2009/0030754 A1 | 1/2009 | McNamar |
| 2010/0031141 A1 | 2/2010 | Summers et al. |
| 2010/0122154 A1 | 5/2010 | Howell et al. |
| 2011/0093811 A1 | 4/2011 | Park et al. |
| 2011/0137923 A1 | 6/2011 | Koroteyev et al. |
| 2011/0258167 A1 | 10/2011 | Binstock et al. |
| 2011/0276873 A1 | 11/2011 | Gorur et al. |
| 2013/0019028 A1 | 1/2013 | Myers et al. |

OTHER PUBLICATIONS

Hoffman et al., Extensible Business Reporting Language (XBRL) 2.1, Recommendation—Dec. 31, 2003 + Corrected Errata—Apr. 25, 2005, Apr. 25, 2005, pp. 1-158, editors Engel et al., copyright 2000-2004, 2005 XBRL International.

* cited by examiner

Step 346: Highlight the target concept(s)

```
<xbrli:xbrl xmlns:xbrli="http://www.xbrl.org/2003/instance"
xmlns:xml="http://www.w3.org/XML/1998/namespace" xmlns:xsi="http://www.w3.org/
2001/XMLSchema-instance" xmlns:link="http://www.xbrl.org/2003/linkbase"
xmlns:xlink="http://www.w3.org/1999/xlink" xmlns:iso4217="http://www.xbrl.org/2003/
iso4217" xmlns:utreg="http://www.xbrl.org/2009/utr" xmlns:xbrldi="http://xbrl.org/2006/
xbrldi" xmlns:wfx="http://www.company.com/20120131" xmlns:us-gaap="http://fasb.org/
us-gaap/2011-01-31">
<link:schemaRef xlink:type="simple" xlink:href="wfx-20120131.xsd"/>
<xbrli:context id="I2011Q2">
<xbrli:entity>
<xbrli:identifier scheme="http://www.sec.gov/CIK">0001445305</xbrli:identifier>
</xbrli:entity>
<xbrli:period>
<xbrli:instant>2011-04-01</xbrli:instant>
</xbrli:period>
</xbrli:context>
<xbrli:unit id="usd">
<xbrli:measure>iso4217:USD</xbrli:measure>
</xbrli:unit>
<us-gaap:Investments id="Fact-960B35E5075A1A09AC6BF772AA99CA27"
contextRef="I2011Q2" unitRef="usd" decimals="-2" negated="false"
elementKeyname="Element:CD70FE3F248798BEC1AFF74BB3031F67"
navKey="d|FE583215DAD08F44FF13F749ACD9FEA0|3AE905E2967BECF28CEDF749A
D37D493|3AE905E2967BECF28CEDF749AD37D493|Element:CD70FE3F248798BEC1AF
F74BB3031F67,d|FE583215DAD08F44FF13F749ACD9FEA0|3AE905E2967BECF28CED
F749AD37D493|1FC1C4917B85DB700FA9F74A3E038BF5|Element:CD70FE3F248798BE
C1AFF74BB3031F67">1234000</us-gaap:Investments>
<us-gaap:Cash id="Fact-71178F4B17BCBEF73D2EF76C5F02BE09"
contextRef="I2011Q2" unitRef="usd" decimals="-2" negated="false"
elementKeyname="Element:225EAFA27D46D76DE7B1F74BB300DB07"
navKey="d|FE583215DAD08F44FF13F749ACD9FEA0|3AE905E2967BECF28CEDF749A
D37D493|3AE905E2967BECF28CEDF749AD37D493|Element:225EAFA27D46D76DE7B
1F74BB300DB07,d|FE583215DAD08F44FF13F749ACD9FEA0|3AE905E2967BECF28CE
DF749AD37D493|1FC1C4917B85DB700FA9F74A3E038BF5|Element:225EAFA27D46D7
6DE7B1F74BB300DB07">6987000</us-gaap:Cash>
<us-gaap:Assets id="Fact-02C2891C43AE4B5C7A11F773EBB3DA3E"
contextRef="I2011Q2" unitRef="usd" decimals="-2" negated="false"
elementKeyname="Element:9A92E7627BA89882A417F74BB305C00C"
navKey="d|FE583215DAD08F44FF13F749ACD9FEA0|3AE905E2967BECF28CEDF749A
D37D493|1FC1C4917B85DB700FA9F74A3E038BF5|Element:9A92E7627BA89882A417F
74BB305C00C">9221000</us-gaap:Assets>
<link:footnoteLink xlink:type="extended" xlink:role="http://www.xbrl.org/2003/role/link"/>
</xbrli:xbrl>
```

FIG. 14

SYSTEMS AND METHODS FOR NAVIGATING TO ERRORS IN AN XBRL DOCUMENT USING METADATA

CROSS-REFERENCE TO RELATED APPLICATION

This Application is a continuation application of U.S. patent application Ser. No. 13/829,442, filed Mar. 14, 2013, which claims the priority benefit of U.S. Provisional Patent Application No. 61/618,419 entitled "SYSTEMS AND METHODS FOR NAVIGATING TO ERRORS IN AN XBRL DOCUMENT USING METADATA" and filed on Mar. 30, 2012, which is hereby incorporated herein by reference in its entirety.

BACKGROUND

Field

Embodiments generally relate to encoding of data in documents, and more particularly to systems and methods for navigating to errors in an eXtensible Business Reporting Language (XBRL) document using meta data.

Related Art

XBRL is a standardized computer language by which businesses may efficiently and accurately communicate business data with each other and with regulating agencies. It is a markup language not too dissimilar from XML (eXtensible Markup Language) and HTML (Hyper Text Markup Language). HTML was designed to display general-purpose data in a standardized way, XML was designed to transport and store general-purpose data in a standardized way, and XBRL was designed to transport and store business data in a standardized way.

XBRL is bringing about a dramatic change in the way people think about exchanging business information. Financial disclosures are a prime example of an industry built around a paper based process that is being pushed into the technological age. This transition involves a paradigm shift from the pixel perfect world of building unstructured reports to a digital world where structured data is dominant.

In existing business reporting systems and methods using XBRL, creating an XBRL representation of a business document is a laborious and error-prone task. A user would need to start with an existing business document such as a computer spreadsheet or word processing document, create a separate XBRL representation of the business document, and run a validation tool to see if there are any errors in the XBRL document. If there are errors in the XBRL document, the user would need to understand the technical details of the XBRL syntax in order to understand the error, figure out where the error originated, and correct the error. Because of the complexities, the time and expense associated with creating XBRL documents has traditionally been very high, and the number of people able to prepare XBRL documents has been suppressed.

SUMMARY

In various embodiments, an XBRL document preparation system includes: a computer processor. The XBRL document preparation system also includes an XBRL taxonomy module that includes one or more XBRL taxonomies having one or more XBRL concepts. In addition, the system includes a business document editor module that facilitates tagging of one or more entries of a business document with one or more XBRL tags based on the XBRL concepts, and generating an XBRL document including XBRL code corresponding to the tagged one or more entries of the business document. Furthermore, the system includes an XBRL document validation system that validates the generated XBRL document and generates at least one of validation errors and warnings corresponding to the XBRL code. Additionally, the system includes an XBRL validation report processing module that associates at least one of the generated validation errors and warnings with a specific source among the one or more tagged entries of the business document. Also, the system includes a user interface module that identifies and facilitates editing the specific source among the one or more tagged entries of the business document.

The XBRL document preparation system may also include an interface to an external XBRL validation system, and the external XBRL validation system may validate the generated XBRL document and may generate the generated validation errors and warnings corresponding to the XBRL code via the interface to the external XBRL validation system.

The interface to the external XBRL validation system may generate a data file including the XBRL code and navigation keys, each of the navigation keys associating a specific segment of the XBRL code with one or more specific sources among the one or more tagged entries of the business document, and the XBRL validation report processing module may use the navigation keys to associate at least one of the generated validation errors and warnings with the specific source among the one or more tagged entries of the business document.

The navigation keys of the data file may further associate a specific segment of the XBRL code with one or more specific sources among the one or more XBRL taxonomies.

The user interface module may identify and facilitate editing the specific source by navigating the one or more XBRL taxonomies having specific one or more XBRL concepts associated with at least one of the generated validation errors and warnings.

The interface to the external XBRL validation system may communicate with the external XBRL validation system over a computer communication network.

The interface to the external XBRL validation system may include a data store accessible by both the XBRL document preparation system and the external XBRL validation system.

The user interface may facilitate navigation of the business document to identify and edit the specific source among the one or more tagged entries of the business document via an outline.

The user interface may facilitate navigation of the business document to identify and edit the specific source among the one or more tagged entries of the business document via autoscrolling the business document to the one or more tagged entries.

In various embodiments, an XBRL document preparation system includes a computer processor. The system also includes an XBRL taxonomy module that includes one or more XBRL taxonomies having one or more XBRL concepts. The system additionally includes a business document editor module that facilitates tagging of one or more entries of a business document with one or more XBRL tags based on the XBRL concepts, and generating an XBRL document including XBRL code corresponding to the tagged one or more entries of the business document. Also, the system includes an interface to an external XBRL validation system that validates the generated XBRL document and generates at least one of validation errors and warnings corresponding to the XBRL code via the interface to the external XBRL validation system, the interface to the external XBRL validation system generating a data file including the XBRL code and navigation keys, each of the navigation keys associating a specific segment of the XBRL code with one or more specific sources among the one or more tagged entries of the business document. The system further includes an XBRL validation report processing module that associates at least one of the generated validation errors and warnings with a specific source among the one or more tagged entries of the business document using the navigation keys. Also, the system includes a user interface module that identifies and facilitates editing the specific source among the one or more tagged entries of the business document and facilitates navigation of the business document to identify and edit the specific source among the one or more tagged entries of the business document via an outline.

In various embodiments, a method of XBRL document preparation includes tagging, by a computer, one or more entries of a business document with one or more XBRL tags based on one or more XBRL concepts of one or more XBRL taxonomies. The method also includes generating, by a computer, an XBRL document including XBRL code corresponding to the tagged one or more entries of the business document. The method additionally includes executing, by a computer, an XBRL validation system to validate the generated XBRL document and generate at least one of validation errors and warnings corresponding to the XBRL code. The method further includes processing, by a computer, to associate at least one of the generated validation errors and warnings with a specific source among the one or more tagged entries of the business document. Also, the method includes identifying and facilitating editing, by a computer, the specific source among the one or more tagged entries of the business document.

Various embodiments include a non-transitory computer readable storage medium having stored thereon a computer program executable by a computer processor for performing the method of XBRL document preparation.

BRIEF DESCRIPTION OF THE DRAWINGS

The above and other features and advantages of the invention will become more apparent by describing in detail exemplary embodiments thereof with reference to the attached drawings listed below:

FIG. 14 illustrates an exemplary segment of an XBRL document including NavKeys.

DETAILED DESCRIPTION

Figure 1:
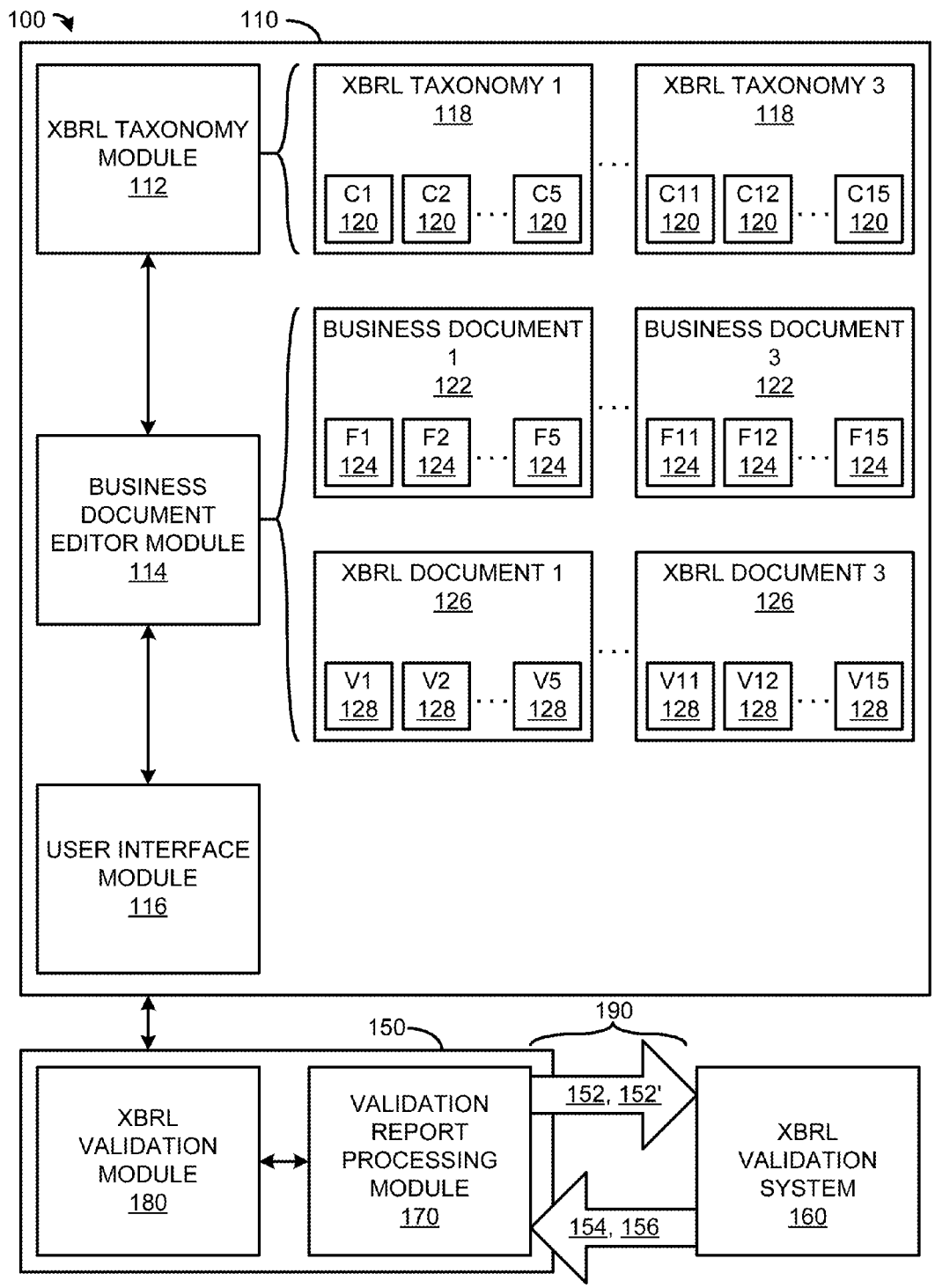
FIG. 1 illustrates an architecture of an XBRL document preparation system including an XBRL document tagging system and an XBRL validation system having an interface to an external XBRL validation system, according to an embodiment.

In various embodiments, XBRL validation issues are resolved using a single document data model. In a single document data model, a single document comprises all data needed for a human-readable business report and an XBRL report for complying with financial reporting requirements. Preparers of reports using XBRL may start with a work environment in which they are already comfortable, in particular, a business report in a familiar editing environment. The work environment may include a software system executing on a computing processor. The work environment may also include data communications over a computer network, for example, a local area network using WiFi or Ethernet, and the Internet, and both logical and physical data storage devices accessible over the computer network. The preparers may then use the work environment with which they are already familiar to apply layers of structured data using XBRL without requiring a technical knowledge of XBRL syntax.

In the process of layering on this structured data, a process commonly referred to as tagging, various issues can arise which can be quite technical in nature. These issues can include errors of various types. In embodiments, these technical issues may be addressed within the work environment using multiple layers of checks to validate the XBRL. These multiple layers include both real-time validation and external validation. The real-time validation may be performed within the work environment by working with the internal data structures, for example. The external validation may include use of external XBRL validation systems to perform validation of data files representing the XBRL created within the work environment. In order to integrate the external validation results into the work environment, embodiments include navigation ties in the data files that relate data items and XBRL syntax within the data file to source documents and XBRL Extension Taxonomies within the work environment.

A software solution may output XBRL documents which can be validated by another system in a straightforward manner. For example, such a process may be performed when XBRL filings are prepared and transmitted to the Securities and Exchange Commission. In a manner similar to computer language compilers and software integrated development environments, most existing XBRL validation systems provide technical references back to the calling program with pointers to the source or sources of a problem identified by the validation system as well as a link to a rule or specification which is violated by the XBRL document. Using the information from the validation system, a user of an existing system would manually trace the references (which may be either line numbers or xPath expressions) through the source files to discover the XBRL syntax which caused the problem. This is a daunting task for most preparers of XBRL documents, who find it very challenging to piece together the various hints and attempt to sort out where in the originating system and source files and documents a change needs to be made to correct the problem reported by the validation system. Preparers may never deal directly with technical files themselves, and may not have the technical knowledge required to find and correct the source of the problem.

In various embodiments, an XBRL document preparation system may facilitate users to identify the root problems reported by a validation system and correct them without requiring technical knowledge to find the root problems and correct the XBRL syntax directly. The embodiments include a process for tracking additional metadata or "hooks" which provide the necessary back references from the validation system into the XBRL document preparation system. These metadata are referred to as navigation keys or "NavKeys" herein. When the XBRL document preparation system produces an XBRL data file to send to a validation system, the data file may be generated to include NavKeys for use by the XBRL document preparation system to identify locations within the XBRL document preparation system, including locations within source documents and XBRL Extension Taxonomies, that are associated with any error messages or warning messages produced by the validation system.

FIG. 1 illustrates an architecture of an XBRL document preparation system 100 including an XBRL document tagging system 110 and an XBRL document validation system having an interface 190 to an external XBRL validation system 160, according to an embodiment. The external XBRL validation system 160 may be provided by or controlled by a same organization that controls the XBRL document preparation system 100, or may be provided by or controlled by a third party. The external XBRL validation system 160 may be a separate system from the XBRL document preparation system 100, and may be executed on a separate computer system from the XBRL document preparation system 100. The XBRL document tagging system 110 includes an XBRL taxonomy module 112, a business document editor module 114, and a user interface module 116. The XBRL taxonomy module 112 includes one or more XBRL taxonomies and/or XBRL extension taxonomies 118, each of which includes one or more XBRL concepts 120. The business document editor module 114 includes one or more business documents 122. The business documents 122 may be text-based and/or spreadsheet-based documents that document business activities, and may be printable for reading by people. The business document editor module 114 facilitates tagging of business document entries or facts 124 with XBRL tags using the XBRL taxonomy module 112. The business document editor module 114 also includes XBRL documents 126 that includes the generated XBRL code associated with the business documents 122. The user interface module 116 identifies and facilitates editing of specific business document entries 124 and XBRL taxonomy concepts 120 associated with validation errors 156 listed in an XBRL validation report 154 produced by the external XBRL validation system 160. The interface 190 to the external XBRL validation system 160 from the XBRL document validation system 150 is established by an XBRL validation report processing module 170. The XBRL validation report processing module 170 may call the external XBRL validation system 160 using data files 152 and/or 152' (discussed in greater detail below) that include XBRL code to be validated. When the external XBRL validation system 160 completes the validation, the XBRL validation report processing module 170 may post-process the XBRL validation reports 154 received from the external XBRL validation system 160 in order to associate the validation errors 156 with the business documents 122 and/or business document entries 124 and XBRL taxonomies 118 and/or XBRL concepts 120, as well as the associated XBRL documents 126.

In various embodiments, the XBRL document validation system 150 may also include an XBRL validation module 180 that provides the combined functionality of the external XBRL validation system 160 and the XBRL validation report processing module 170 within the XBRL document preparation system 100 without requiring access to an external system or third party.

Figure 2:
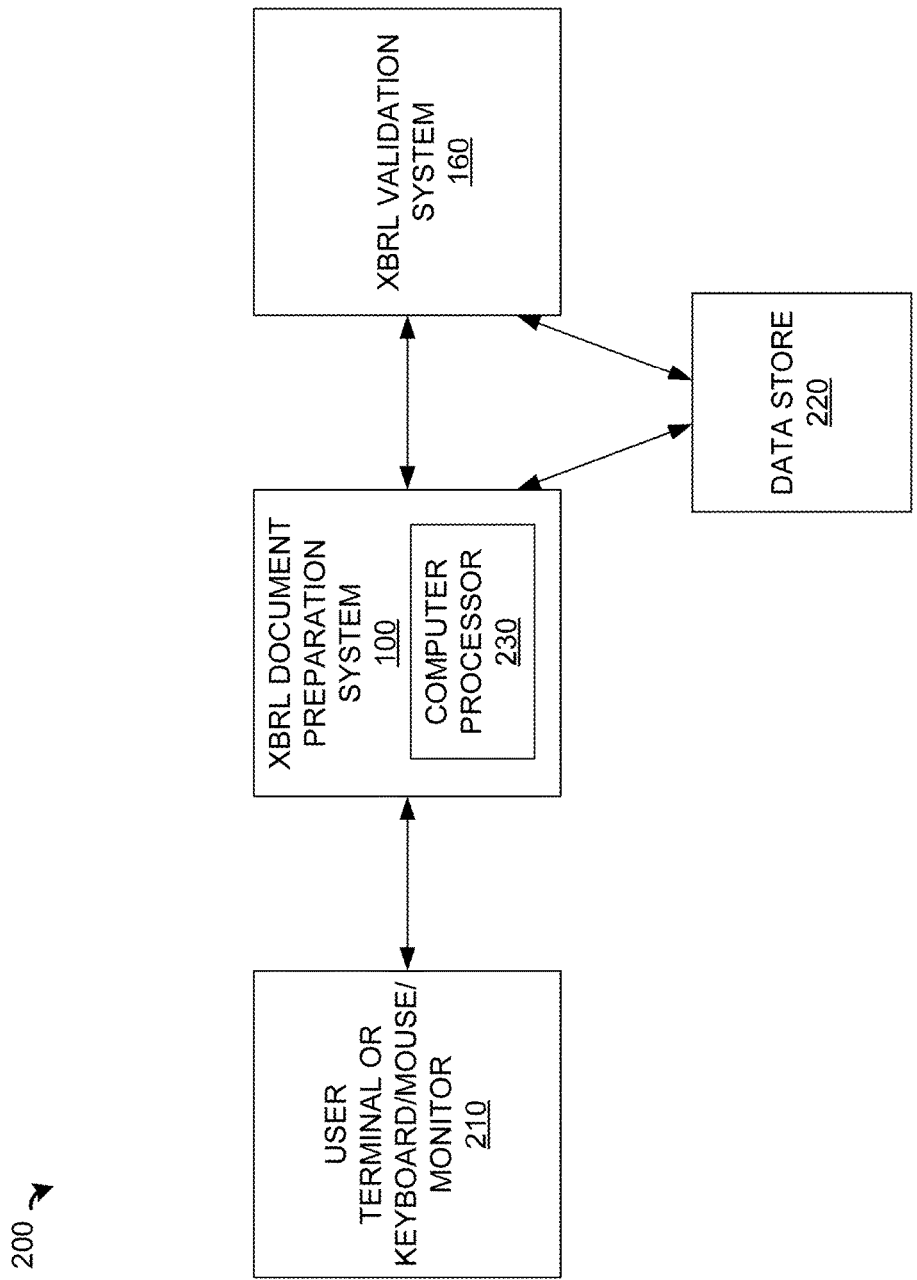
FIG. 2 illustrates a network architecture including the XBRL document preparation system and the external XBRL validation system, according to an embodiment.

FIG. 2 illustrates a network architecture 200 including the XBRL document preparation system 100 and the external XBRL validation system 160, according to an embodiment. In various embodiments, a user may use the XBRL document preparation system 100 on a local computer, or on a remote computer over a network, each of which may include a computer processor 230. Likewise, in various embodiments, the validation system may operate on a computer local to the user, local to the XBRL document preparation system 100, or remote from both over a network. In various embodiments, one or both of the XBRL document preparation system 100 or the external XBRL validation system 160 may be implemented using client-server architectures or as Software as a Service (SaaS) products. The XBRL document preparation system 100 may be controlled by and communicate via a user terminal or keyboard/mouse/monitor 210. The user terminal or keyboard/mouse/monitor 210 may be communicatively coupled with the XBRL document preparation system 100 via a direct electrical connection, for example USB, Thunderbolt, DisplayPort, VGA, HDMI, etc.

Alternatively, the user terminal or keyboard/mouse/monitor 210 may be communicatively coupled with the XBRL document preparation system 100 via a network connection, for example a local area network using WiFi or Ethernet. Likewise, one or both of the XBRL document preparation system 100 and the external XBRL validation system 160 may be communicatively coupled with a data store 220. The data store 220 may include a hard disk drive and/or solid state drive communicatively coupled with both the XBRL document preparation system 100 and the third-party XBRL validation system 160. The data store 220 may be a network-attached storage system, a network server, or other data storage device capable of communicating with both the XBRL document preparation system 100 and external XBRL validation system 160 as known in the art.

Figure 3:
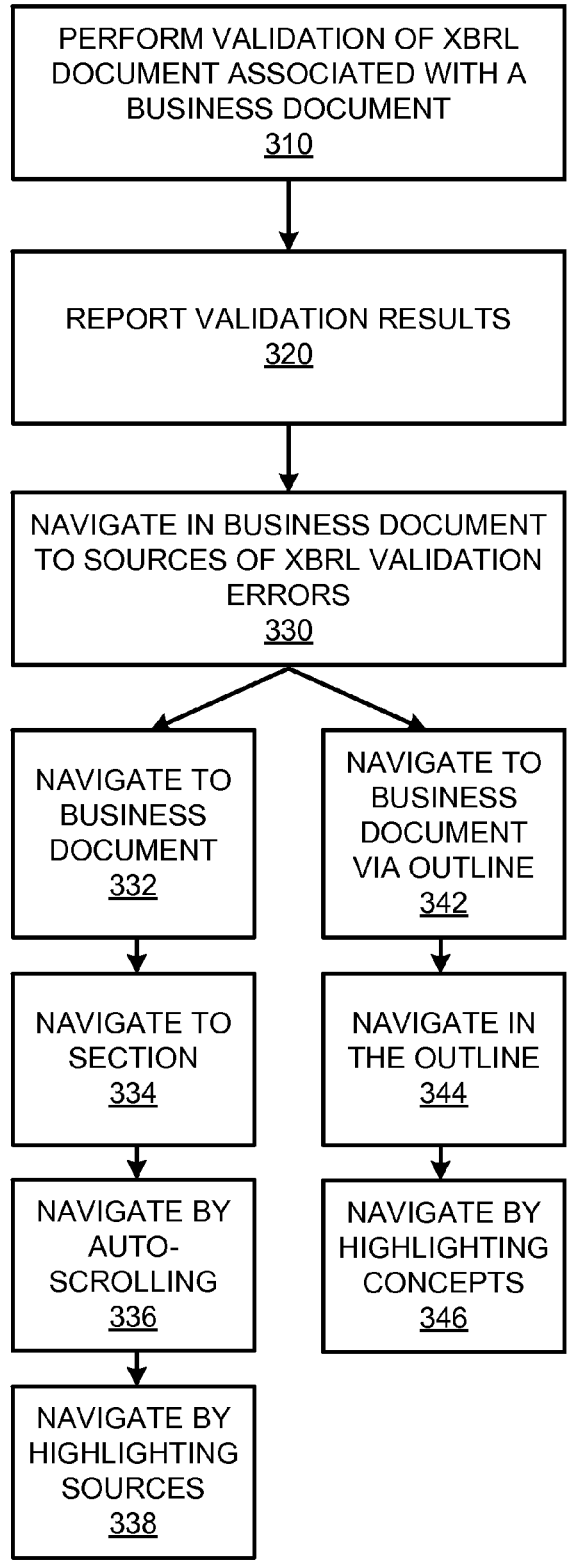
FIG. 3 illustrates a method of XBRL document validation, according to an embodiment.

FIG. 3 illustrates a method of XBRL document validation 300, according to an embodiment. In a step 310, validation of an XBRL document 126 associated with a business document 122 is performed. The validation may be performed by using the third-party XBRL validation system 160, and/or by using the XBRL validation module 180 of the XBRL document preparation system 100.

For example, when a user of the XBRL document preparation system 100 validates the XBRL document 126 using an external XBRL validation system 160, the XBRL document preparation system 100 may create a data file 152 that includes code fragments referred to herein as "NavKeys" to relate the XBRL tags within the data file 152 back to the source business document 122 and XBRL Extension Taxonomies 118 within the user's work environment of the XBRL document preparation system 100. In various embodiments, a second data file 152' may be created which does not include the NavKeys (a "clean" file). The external XBRL validation system 160 may then be called by the XBRL document preparation system 100 to load one of the data files 152 and 152', either the clean file 152' or the data file including the NavKeys 152, and perform the XBRL validation.

In a step 320, the external XBRL validation system 160 reports the results of the XBRL validation. After the external XBRL validation system 160 completes, the external XBRL validation system 160 may create an XBRL validation report or output file 154 identifying locations in the input data file 152 and 152' (either the clean file 152' or the data file including the NavKeys 152) that create errors and/or warnings 156. Then, the XBRL XBRL validation report processing module 170 may post-process the report 154 to associate errors and warnings directly to source document locations or business document entries 124. The post-processing output may then be fed to reports and the editing environment within the XBRL document preparation system 100.

In a step 330, the XBRL document preparation system 100 navigates to one or more sources of XBRL validation errors 156 in the business documents 122 and/or XBRL taxonomies 118. Once the post-processing output from the XBRL validation report processing module 170 is fed back into the editing environment of the XBRL document preparation system 100, the user may simply double-click or select one of the errors or warnings 156 using the user interface module 116 and click a "view location" button to navigate to the problem source within the XBRL document preparation system 100. Double-clicking on the errors or warnings 156 may open a navigation window showing all the locations in the various business documents 122 and XBRL taxonomies 118 in the XBRL document preparation system 100 that are sources of the errors or warnings 156. Using this process, users of the XBRL document preparation system 100 may resolve technical syntax and specification issues, which may be as high as hundreds or thousands in number, without ever having to understand or edit an XBRL file.

In an example of the post-processing performed by the XBRL document preparation system 100, the XBRL document preparation system 100 may read the report from the external XBRL validation system 160 and associate the NavKeys in the data file 152 sent to the validation tool with the errors and warnings 156 generated by the external XBRL validation system 160. In embodiments where the external XBRL validation system 160 is given the clean data file 152' but not the data file 152 including the NavKeys, the XBRL document preparation system 100 may further associate the lines of the clean data file 152' with the lines of the data file 152 including the NavKeys in order to associate the errors and warnings generated by the external XBRL validation system 160 with the NavKeys and ultimately with the source business documents 122 and XBRL Extension Taxonomies 118 of the XBRL document preparation system 100.

The XBRL document preparation system 100 may perform a large vocabulary translation in order to provide non-technically trained people using the XBRL document preparation system 100 with an accurate summary of problems reported by the external XBRL validation system 160 and the XBRL document validation system 150 in layman's terms which the non-technically trained users may understand and be empowered to correct using the XBRL document preparation system 100. The translation facilitates the user to operate at a semantic and domain level, not at a syntax level, in working with XBRL documents.

Figure 4:
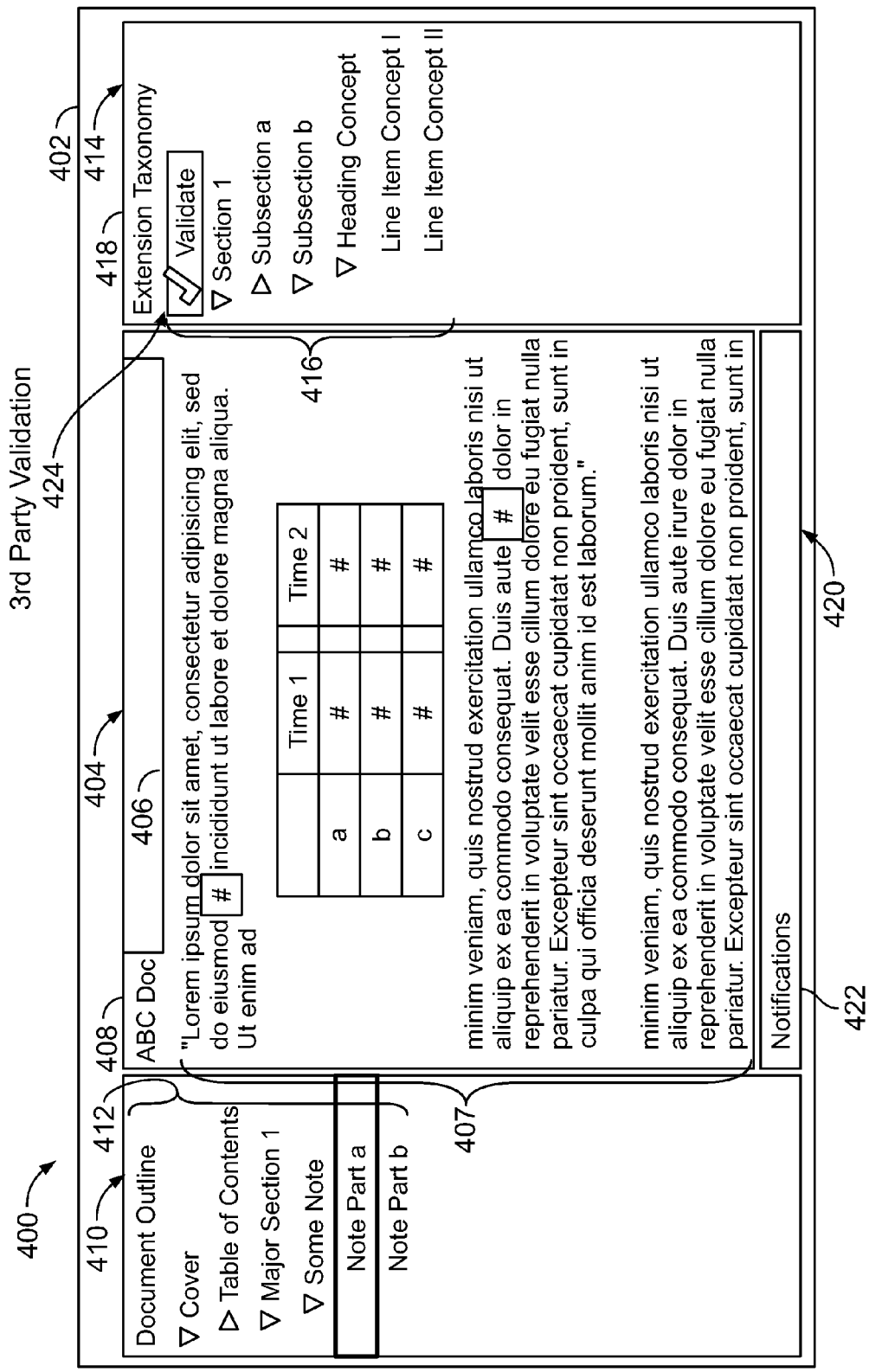
FIG. 4 illustrates a computer software user interface for XBRL document preparation in a stage of beginning validation of an XBRL document, according to an embodiment.

FIGS. 4-13 illustrate a computer software user interface for XBRL document preparation in various stages of validating and correcting detected errors in an XBRL document 126, according to various embodiments. FIG. 4 illustrates a computer software user interface 400 for XBRL document preparation in a stage of beginning validation of an XBRL document 126, according to an embodiment. As illustrated in FIG. 4, an editor window 402 of the user interface 400 includes four primary panels as described below.

A top center panel 404 includes an editor window 406 of a business document which may include text, tables, graphs, and the like as are commonly included in business reports. In various embodiments, multiple editor windows 406 may be included in the top center panel 404 and tabbed such that a different tab 408 at the top of the top center panel 404 corresponds with each of the multiple editor windows 406. As illustrated in FIG. 4 of the present embodiment, only one editor window 406 is shown. The editor window 406 may be functional to edit the document 407 in a manner as known in the arts of electronic word processors, spreadsheets, and the like. The document 407 may be an embodiment of the business document 122.

A left panel 410 presents an outline 412 of the business document 407 shown in the editor window 406. The document outline 412 may be operable to expand different levels of the outline 412 and facilitate navigating the business document 407 in the editor window 406 by selecting desired headings in the document outline 412. For example, clicking "Note part a" in the document outline 412 may cause the editor window 406 to navigate to the heading "Note part a" in the business document 407.

A right panel 414 presents an outline of an XBRL taxonomy 416 in a taxonomy window 418 being used to encode the XBRL document 126 based on data in the business document 407 of the editor window 406. The XBRL taxonomy 416 may be an embodiment of the XBRL taxonomy 118, for example, an extension taxonomy.

A bottom center panel 420 presents a notifications window 422. The notifications window 422 may show various messages or notifications from the user interface 400 to the user. The notifications may be related to operations of the XBRL document preparation system 100 including editing of the business document 122, creation of the XBRL document 118, or validation of the XBRL document using the XBRL document validation system 150, for example.

As illustrated in FIG. 4, the user may select "Validate" 424 in the taxonomy window 418 to perform a validation of the created XBRL document 126 according to a validation methodology. In various embodiments, the validation may be performed within the same software program of the XBRL document preparation system 100 in which the editing of the business document 122 and creation of the XBRL document 126 are performed. In the illustrated embodiment of FIG. 4, however, validation is performed according to the third-party XBRL validation system 160 external to the software program of the XBRL document preparation system 100 in which the editing of the business document 122 and creation of the XBRL document 126 are performed.

Figure 5:
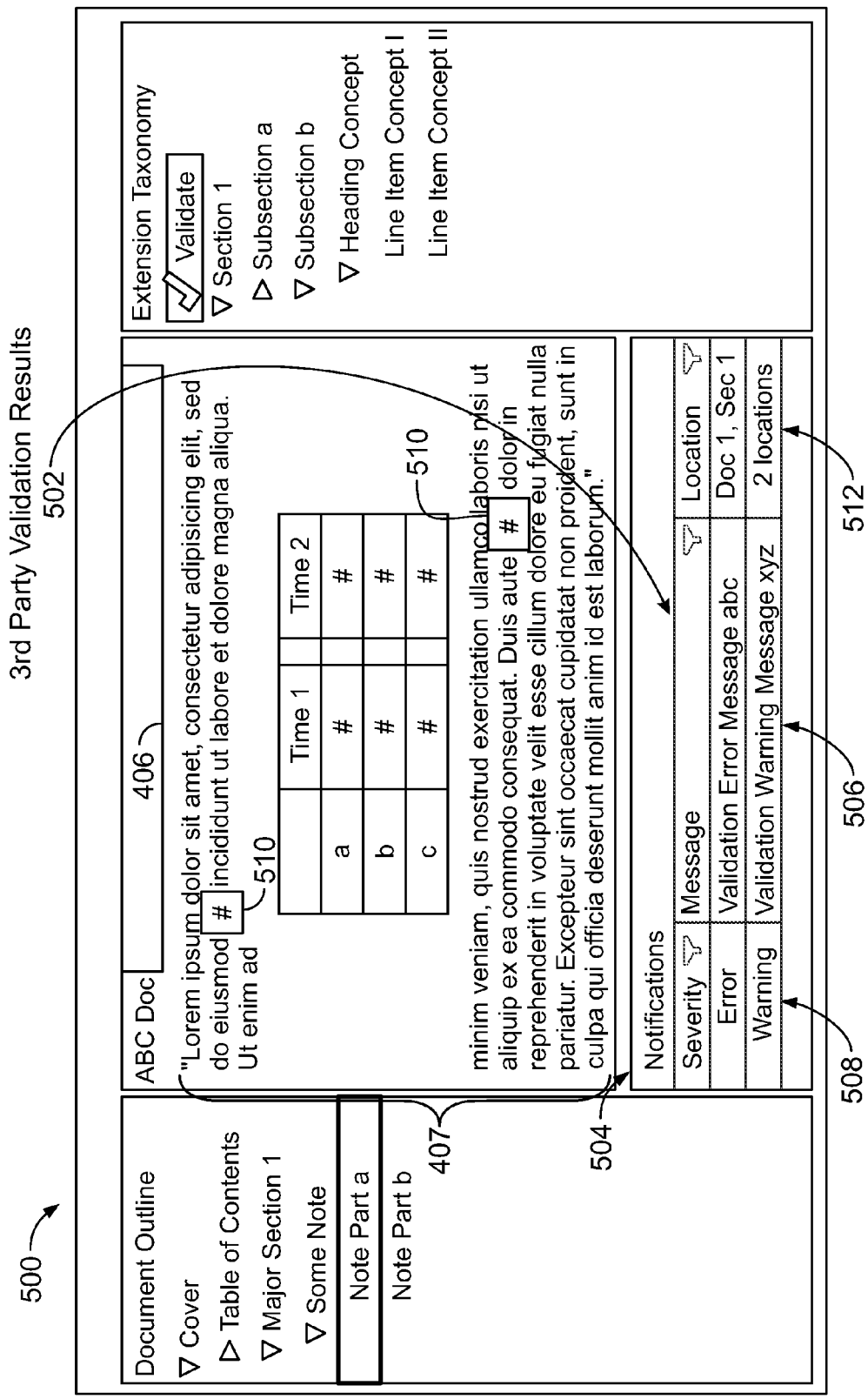
FIG. 5 illustrates a computer software user interface for XBRL document preparation in a stage of reporting validation results from validation of the XBRL document, according to an embodiment.

FIG. 5 illustrates a computer software user interface 500 for XBRL document preparation in a stage of reporting validation results 502 from validation of the XBRL document 407, according to an embodiment. During or after the external XBRL validation system 160 completes validation of the XBRL document 126, the Notifications window 504 displays validation errors and warnings 508 from the external XBRL validation system 160. The Notifications window 504 may be an embodiment of the Notifications window 422. These validation results 502 may include error and warning messages 506 of various severities associated with the errors and warnings 508. One or more locations 512 within business documents 122 and XBRL taxonomies 118 may be associated with each error and warning message 506. The associated locations 512 may be displayed in the Notifications window 504 along with the error and warning messages 506. A number of error and warning messages 506 and amount of information included with the error and warning messages 506 may exceed an amount which may be viewed with a standard amount of space allocated to the Notifications window 504. Therefore, the Notifications window 504 may expand or be scrollable when needed to facilitate the display of all error and warning messages 506 or other notifications.

The user may select a result 502 or error or warning message 506 from the Notifications window 504 in order to view a location 510 in the business document 407 associated with the result 502 or error or warning message 506. The locations 510 may be identified as the locations 512 in the Notifications window 504. In various embodiments, the user may perform the selection by double-clicking, using a "View Location" menu item in a context menu, or other selection methods as known in the art of computer user interfaces. In order to locate a desired result 502 or message 506, headings of each of the columns in the Notifications window 504 may include a filter option.

Figure 6:
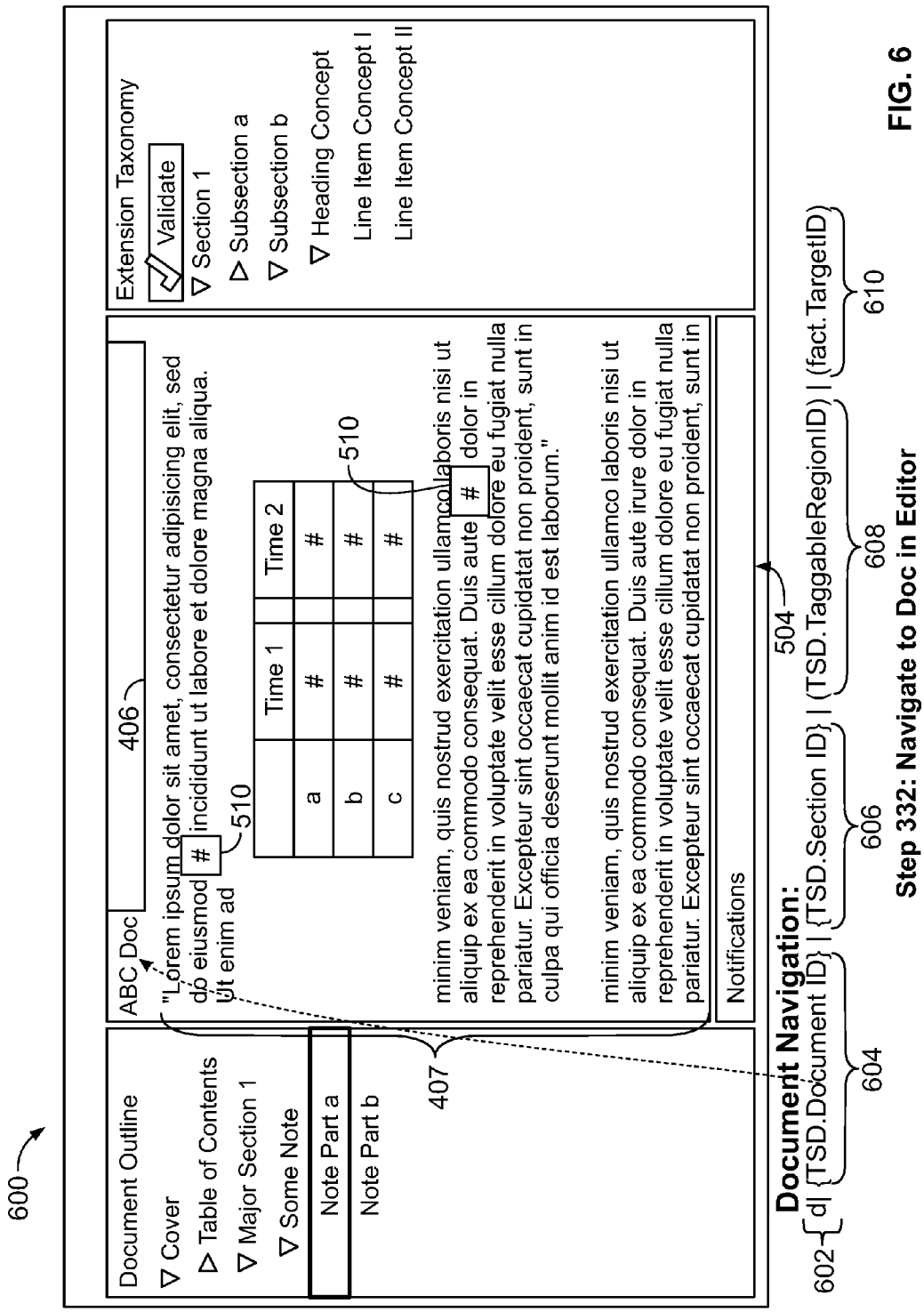
FIG. 6 illustrates a computer software user interface for XBRL document preparation in a step of navigation to a business document containing sources of validation errors and warnings listed in the notifications window, according to an embodiment.

FIG. 6 illustrates a computer software user interface 600 for XBRL document preparation in a step 332 (see FIG. 3) of navigation to a business document 407 containing sources of validation errors and warnings 508 listed in the notifications window 504, according to an embodiment. After double-clicking on an error and warning message 506 in the Notifications window 504 in FIG. 5, a business document 407 associated with the error message opens in the document editing window if it is not already open. If the business document 407 is already open, the business document 407 in the document editor window 406 may be given focus. As illustrated in FIG. 6, a NavKey XBRL tag 602 for navigating within the business document 407 may include parameters to identify the document (604), section (606), region (608), and target (610) for each document source location 510 associated with the error or warning 508 reported in the validation results 502. For example, the parameter "TSD-.Document ID" 604 may identify the associated document 407.

Figure 7:
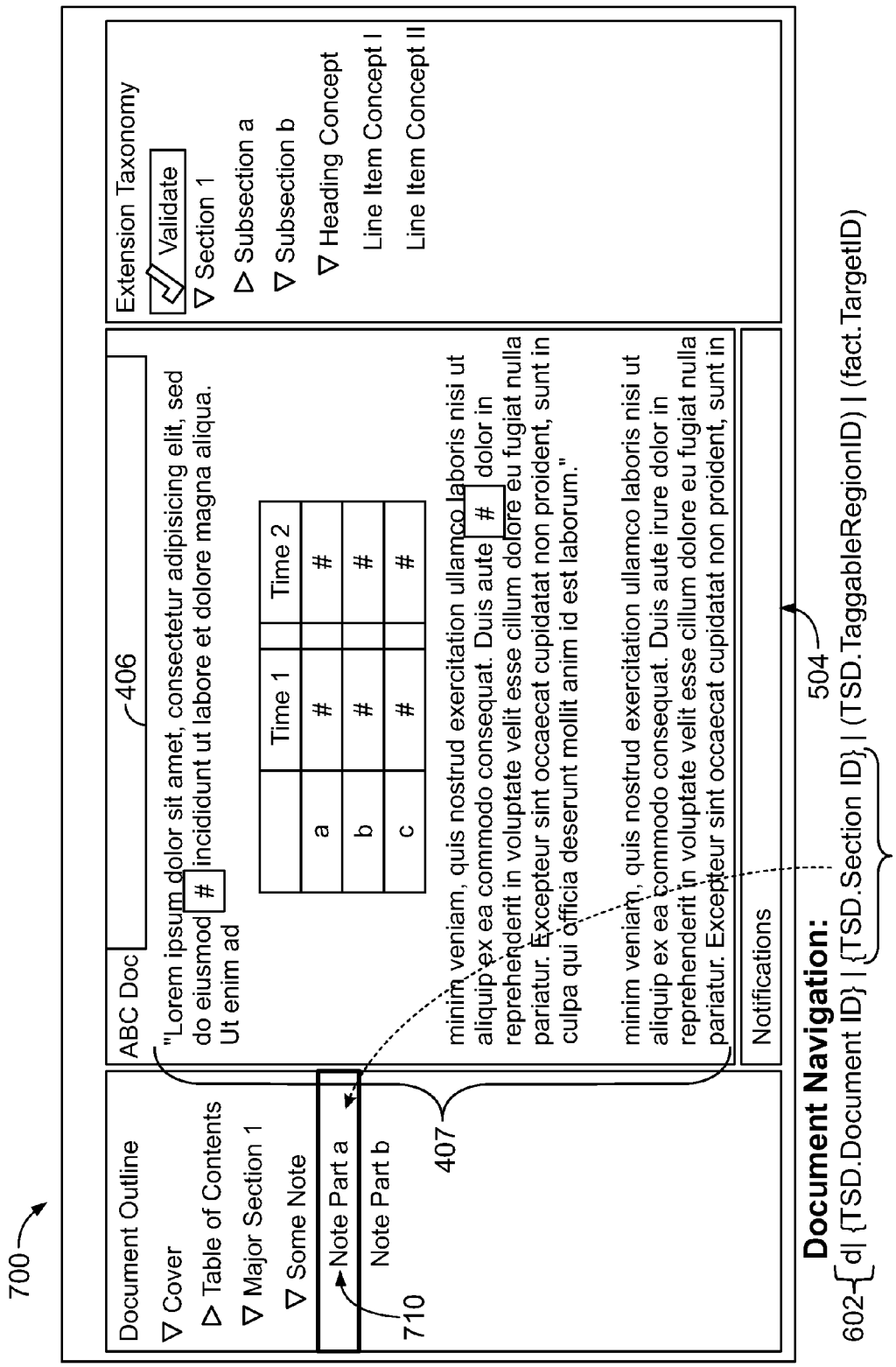
FIG. 7 illustrates a computer software user interface for XBRL document preparation in a step of navigation to a section in the business document containing sources of validation errors and warnings listed in the notifications window, according to an embodiment.

FIG. 7 illustrates a computer software user interface 700 for XBRL document preparation in a step 334 (see FIG. 3) of navigation to a section 710 in the business document 407 containing sources of validation errors and warnings 508 listed in the notifications window 504, according to an embodiment. In step 334, the section 710 of the business document 407 associated with the error message is given focus in the document editor window 406. The parameter "TSD.Section ID" 606 of the NavKey XBRL tag 602 may identify the associated section 710 of the document 407.

Figure 8:
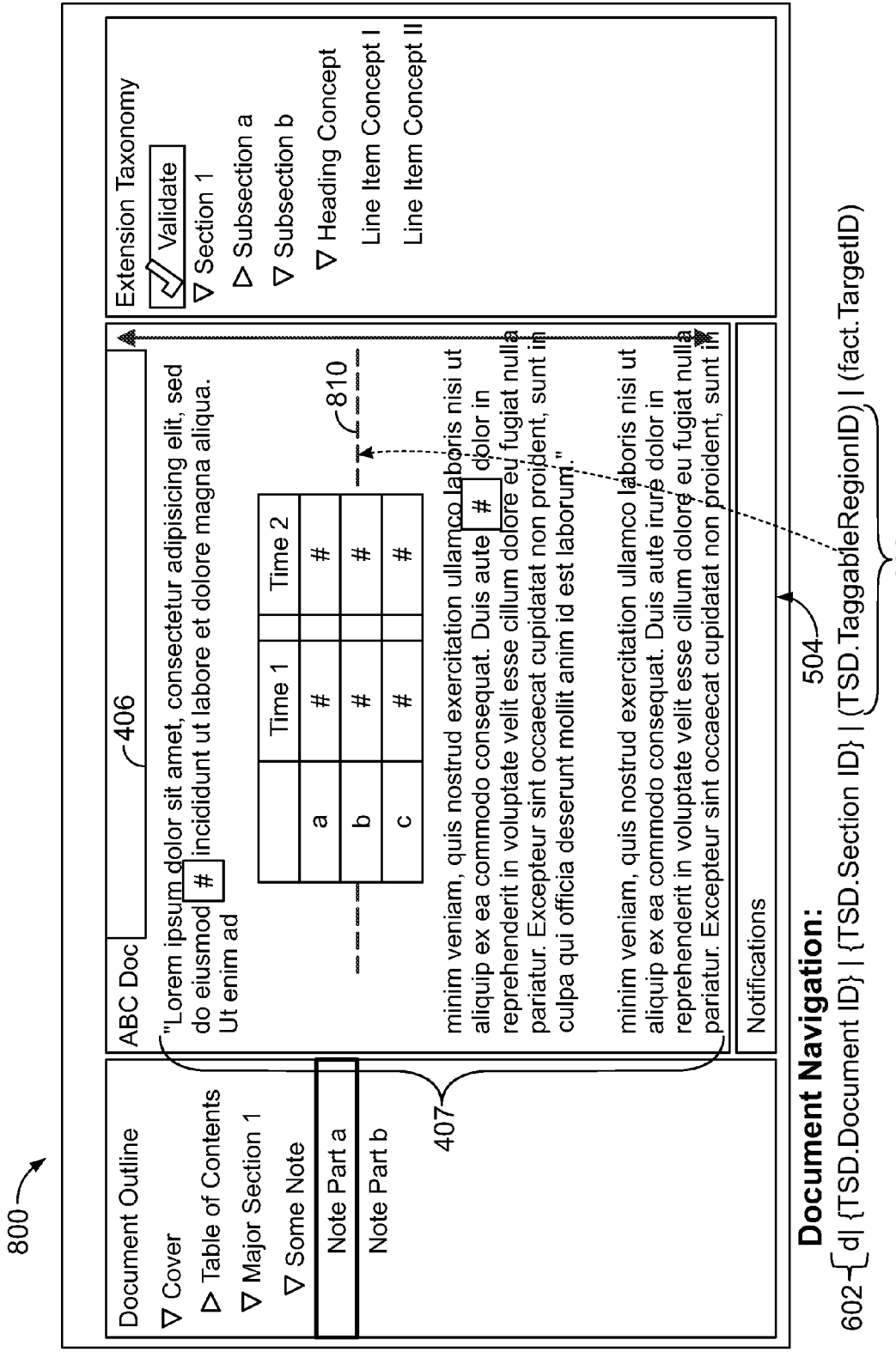
FIG. 8 illustrates a computer software user interface for XBRL document preparation in a step of navigation in the business document by auto-scrolling to sources of validation errors and warnings listed in the notifications window, according to an embodiment.

FIG. 8 illustrates a computer software user interface 800 for XBRL document preparation in a step 336 (see FIG. 3) of navigation in the business document 407 by auto-scrolling to sources of validation errors and warnings 508 listed in the notifications window 504, according to an embodiment. In step 336, the region 810 of the business document 407 associated with the error or warning message 506 is given focus in the document editor window 406. The focus may be achieved by the document editor window 406 automatically scrolling to the region 810, e.g., table or paragraph, associated with the selected message 506 in the Notification window 504. The parameter "TSD.TaggableRegionID" 608 of the NavKey XBRL tag 602 may identify the associated tagged region 810 of the document 407.

Figure 9:
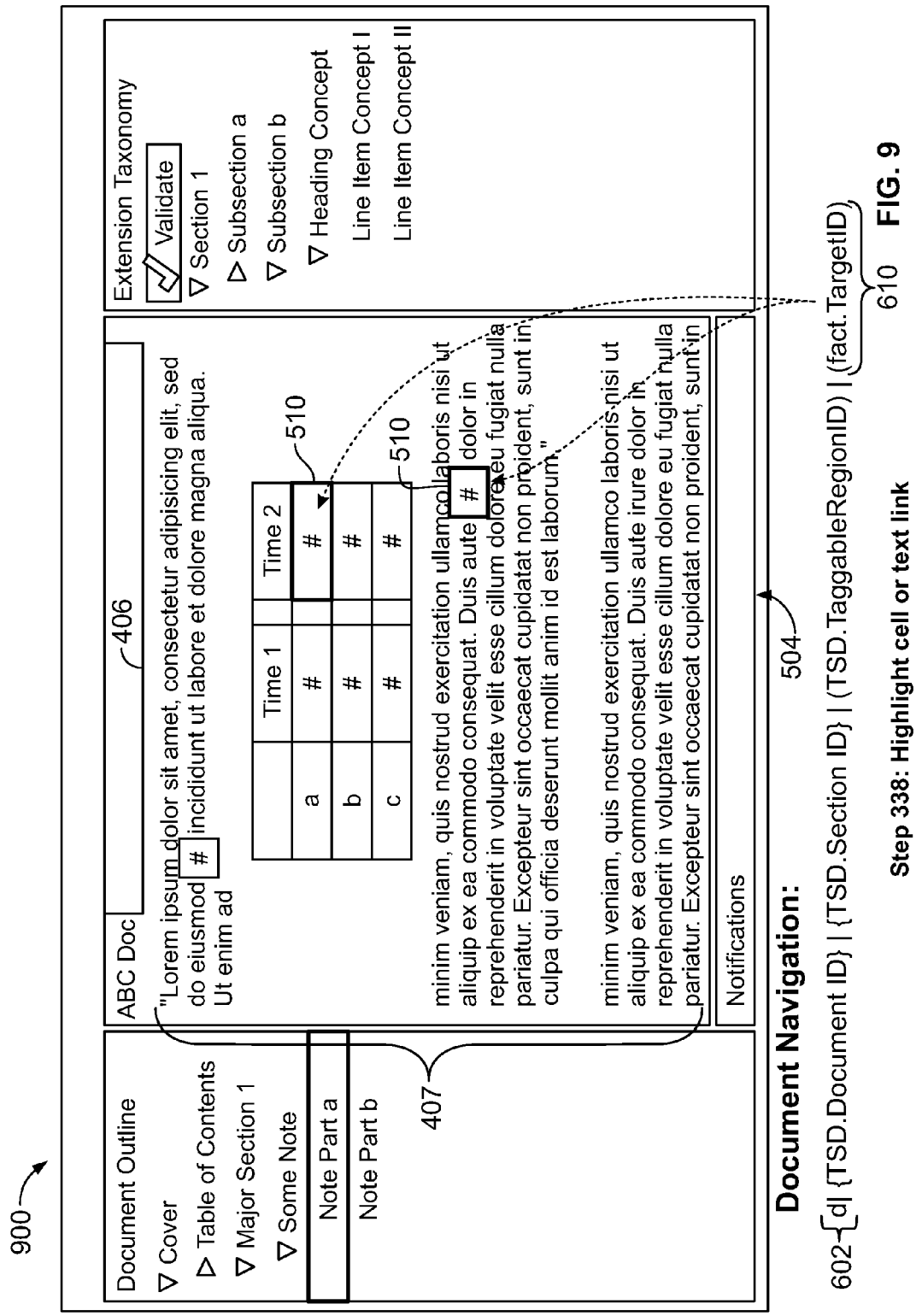
FIG. 9 illustrates a computer software user interface for XBRL document preparation in a step of navigation in the business document by highlighting sources of or locations associated with validation errors and warnings listed in the notifications window, according to an embodiment.

FIG. 9 illustrates a computer software user interface 900 for XBRL document preparation in a step 338 (see FIG. 3) of navigation in the business document 407 by highlighting sources of or locations associated with validation errors and warnings 510 listed in the notifications window 504, according to an embodiment. In step 338, the tagged source or sources 510 of the business document associated with the error or warning message 506 are highlighted in the document editor window 406. The highlighting may be achieved by drawing a square, rectangle, circle, or other geometric shape around the tagged item or items, e.g., table cell or text in a paragraph, associated with the selected message 506 in the Notification window 504. In other embodiments, the highlighting may be achieved by changing a font, color, size, or background color of the tagged source or sources 510. The parameter "fact.TargetID" 610 of the NavKey XBRL tag 602 may identify the associated tagged source or sources 510 of the document 407.

Figure 10:
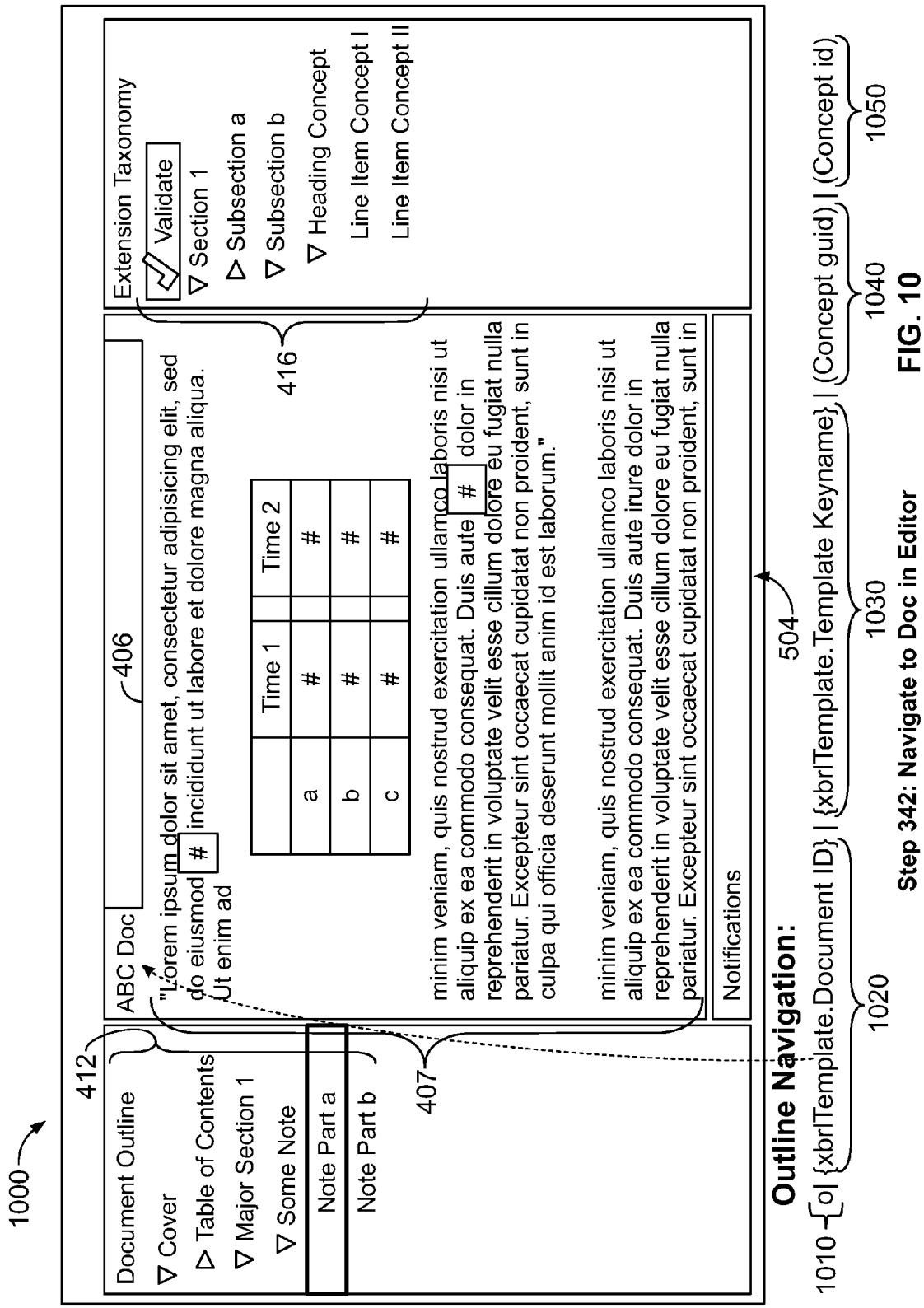
FIG. 10 illustrates a computer software user interface for XBRL document preparation in a step of navigation to a business document containing sources of validation errors and warnings listed in the notifications window, via a taxonomy outline, according to an embodiment.

FIG. 10 illustrates a computer software user interface 1000 for XBRL document preparation in a step 342 (see FIG. 3) of navigation to a business document 407 containing sources of validation errors and warnings 508 listed in the notifications window 504, via a taxonomy outline 416, according to an embodiment. After double-clicking on an error or warning message 506 in the Notifications window 504 in FIG. 5, a business document 407 associated with the error or warning message 506 opens in the document editor window 406 as also illustrated with respect to step 332 of FIG. 6. If the business document 407 is already open, the business document 407 in the document editor window 406 may be given focus. The taxonomy associated with the error or warning message 506 also opens in the taxonomy window 418 if it is not already open. In various embodiments, more than one taxonomy may be open in the right panel 414, and tabs may be used to select which taxonomy window 418 has focus. As illustrated in FIG. 10, the NavKey XBRL tag 1010 for navigating within the taxonomy outline 416 may include parameters to identify the XBRL template document (1020), keyname (1030), concept taxonomy ID (1040), and concept document outline usage ID (1050) for each outline source location associated with the error or warning 508. For example, the parameter "xbrlTemplate.DocumentID" 1020 may identify the associated document 407.

Figure 11:
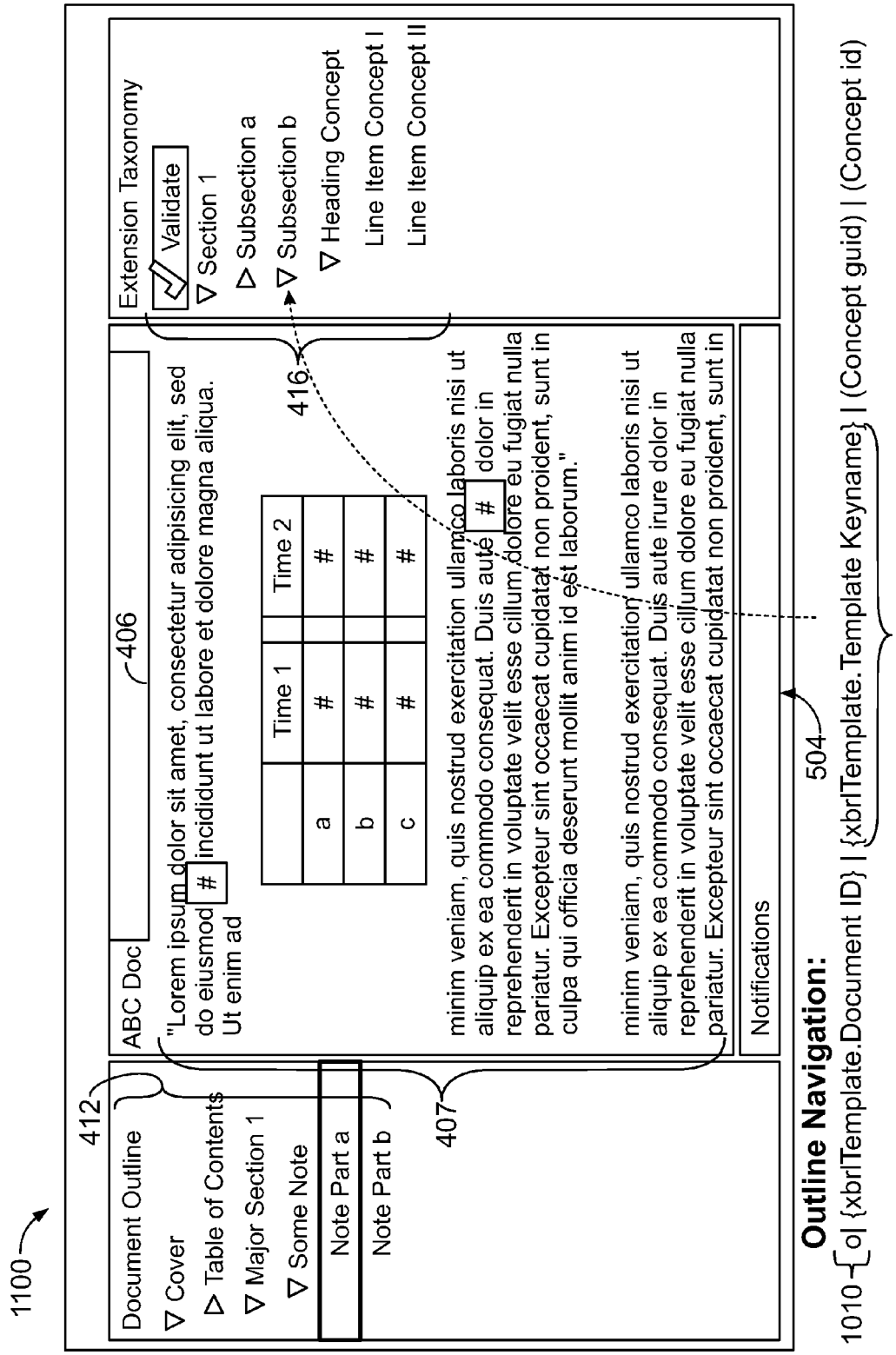
FIG. 11 illustrates a computer software user interface for XBRL document preparation in a step of navigation in the taxonomy outline containing sources of validation errors and warnings listed in the notifications window, via expanding the XBRL taxonomy outline to the desired subsection, according to an embodiment.

FIG. 11 illustrates a computer software user interface 1100 for XBRL document preparation in a step 344 (see FIG. 3) of navigation in the taxonomy outline 416 containing sources of validation errors and warnings 508 listed in the notifications window 504, via expanding the XBRL taxonomy outline 416 to the desired subsection (e.g., "Subsection b"), according to an embodiment. In step 344, the section of the taxonomy outline 416 associated with the selected error or warning message 506 is given focus and expanded to the associated location (e.g., "Subsection b") in the taxonomy window 418. The parameter "xbrlTemplate- .Template Keyname" 1030 of the NavKey XBRL tag 1010 may identify the associated taxonomy template subsection (e.g., "Subsection b").

Figure 12:
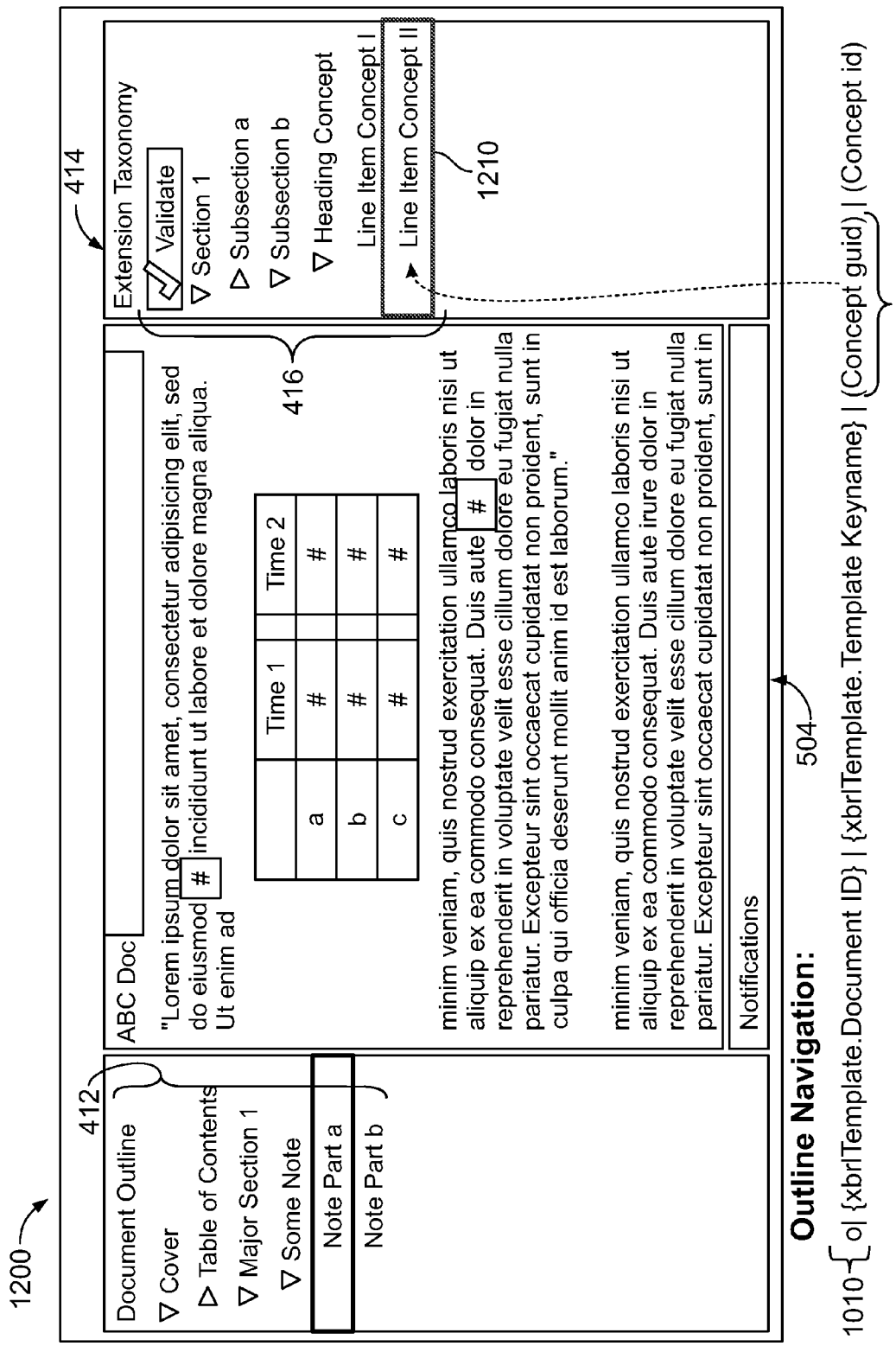
FIG. 12 illustrates a computer software user interface for XBRL document preparation in a step of navigation in the taxonomy outline containing sources of validation errors and warnings listed in the notifications window, via highlighting target concepts in the taxonomy outline, according to an embodiment.

FIG. 12 illustrates a computer software user interface 1200 for XBRL document preparation in a step 346 (see FIG. 3) of navigation in the taxonomy outline 416 containing sources of validation errors and warnings 508 listed in the notifications window 504, via highlighting target concepts 1210 in the taxonomy outline 416, according to an embodiment. The target concepts 1210 may correspond to the XBRL concepts 120, and the taxonomy in the taxonomy window 418 may correspond to the XBRL taxonomy 118. In step 346, the target concept or concepts 1210 of the taxonomy outline 416 associated with the selected error or warning message 506 is highlighted in the taxonomy window 418. The parameter "Concept guid" 1040 of the NavKey XBRL tag 1010 may identify the associated taxonomy target concept or concepts 1210.

Figure 13:
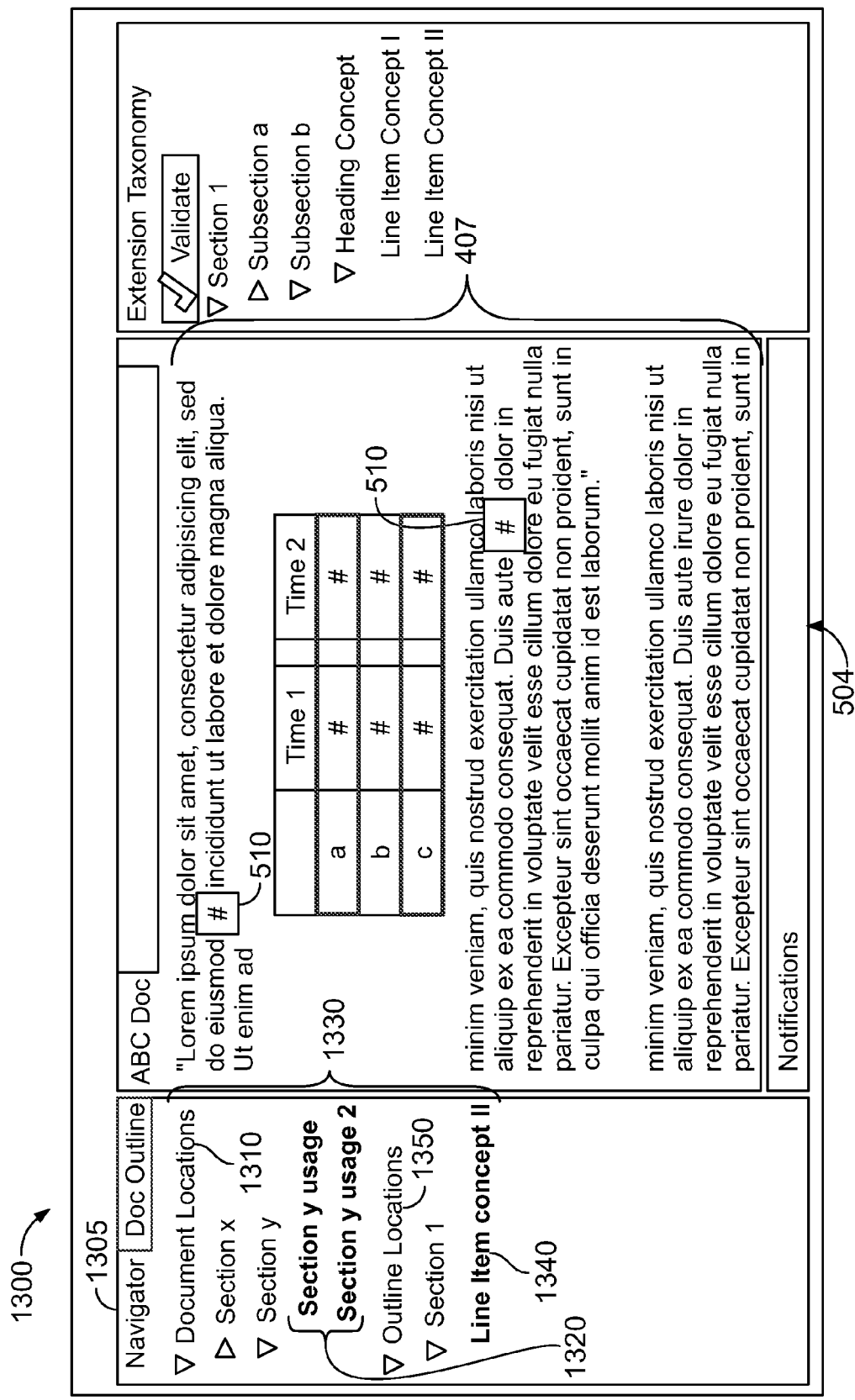
FIG. 13 illustrates a computer software interface for XBRL document preparation in which a navigator window hierarchically lists locations in one or both of the business document and taxonomy outline associated with sources of validation errors and warnings identified in the notifications window, according to an embodiment.

FIG. 13 illustrates a computer software interface 1300 for XBRL document preparation in which a navigator window 1305 hierarchically lists locations in one or both of the business document 407 and taxonomy outline 416 associated with sources of validation errors and warnings 508 identified in the notifications window 504, according to an embodiment. The navigator window 1305 may launch when multiple navigation locations within the business document 407 and/or taxonomy outline 416 are associated with the selected validation error or warning 508 or error or warning message 506 identified in the Notifications window 504. As illustrated in FIG. 13, the tagged source or sources 1320 of the business document 407 associated with the selected validation error or warning 508 or error or warning message 506 are highlighted in a document location hierarchy 1310 of the navigator window 1305 in the left panel 410 of the user interface 1300, while the tagged source or sources 1340 of the taxonomy outline 416 associated with the selected validation error or warning 508 or error or warning message 506 are highlighted in an outline location hierarchy 1330 of the navigator window 1305. The highlighting may include hypertext links to the locations such that the user may click on the link to be taken directly to the associated location 510 in the document editor window 406 or taxonomy window 418, as appropriate. In other words, links within the document locations hierarchy 1310 of the navigator window 1305 direct the user to the document editor window 406 when clicked, while links within the outline locations hierarchy 1330 of the navigator window 1305 direct the user to the taxonomy window 418 when clicked.

FIG. 14 illustrates an exemplary segment of an XBRL document including NavKeys. The NavKeys are present in the XBRL document segment in lines starting with the character sequence "navKey=".

Figure 15:
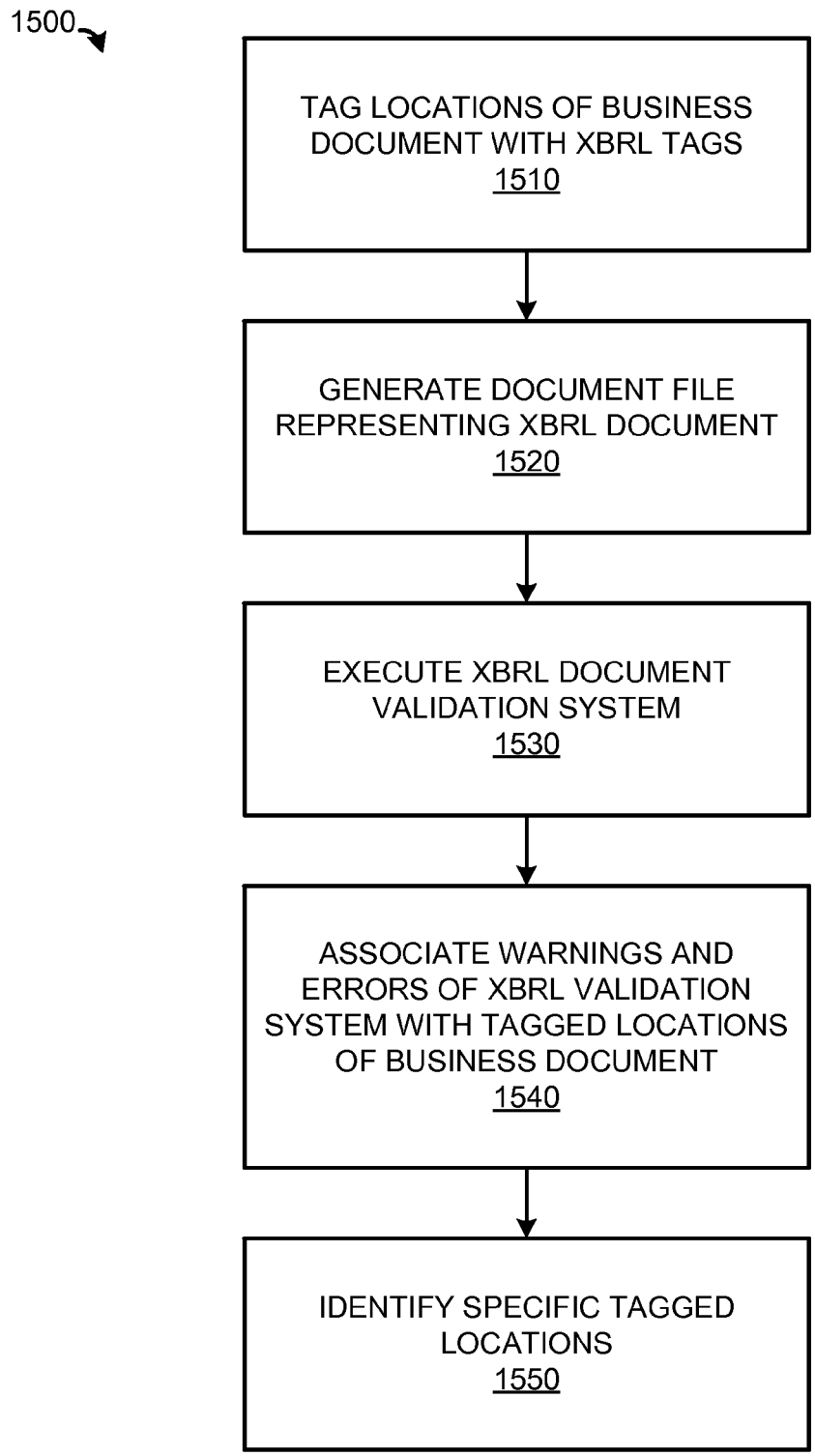
FIG. 15 illustrates a method of XBRL document validation, according to another embodiment.

FIG. 15 illustrates a method of XBRL document validation 1500, according to another embodiment. In a step 1510, locations or facts 124 of a business document 122 are tagged with XBRL tags. The tagging may be performed using the XBRL document tagging system 110. In a step 1520, an XBRL document file representing an XBRL document 126 including XBRL and navigation keys 128 is generated. The XBRL document file may include at least one of the clean XBRL data file 152' and the XBRL data file 152 including the NavKeys that relate segments of XBRL code of the XBRL document 126 and data file 152 with associated facts and locations within the business document 122. In a step 1530, an XBRL document validation system 150 is called. The called XBRL document validation system 150 may include the XBRL validation module 180, the XBRL validation report processing module 170, and the interface 190 to an external validation system. The XBRL document validation system 150 may call the external XBRL validation system 160 using at least one of the clean XBRL data file 152' and the data file 152 including the NavKeys. In a step 1540, warnings and errors of the XBRL validation system 150 are associated with tagged locations of the business document 122 and XBRL taxonomy 118. For example, the external XBRL validation system 160 may return an XBRL validation report 154 that includes validation errors and warnings 156 to the XBRL document validation system 150. The XBRL validation report processing module 170 may process the XBRL validation report 154 that includes validation errors and warnings 156 and, based upon the NavKeys present in the data file 152', create associations within data structures of the XBRL document preparation system 100 that associate the specific warnings and errors 156 of the XBRL validation report 154 with specific facts or locations 124 of the business documents 122 or specific concepts 120 of the XBRL taxonomies 118 and code segments 128 of the XBRL document 126. In a step 1550, specific tagged locations of the business documents 122 associated with the specific warnings and errors of the XBRL validation may be identified. For example, a user may select an error or warning message 506 and the XBRL document preparation system 100 may navigate to specific locations within the documents 122 that correspond to the selected error or warning message 506 using the data structures within the XBRL document preparation system 100 based upon the NavKeys present in the data file 152.

Because the XBRL document preparation system 100 identifies specific locations in the business documents 122 that correspond with specific validation errors or warnings produced during validation of the XBRL document 126 produced by the XBRL document preparation system 100, a user can easily correct the source business document 122 without needing to understand XBRL code syntax or directly access any XBRL code. The user only needs to use the user interface module 116 of the XBRL document tagging system 110 to identify the locations within the business document 122 that need to be edited, and then edit the business document 122 via the business document editor module 114 which the user uses to tag the business document 122 with XBRL tags in order to make revisions and corrections according to the validation error and warning messages 506.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A document preparation system comprising:
   a computer processor;
   a taxonomy module including one or more taxonomies having one or more concepts;
   a document editor module that facilitates:
   tagging of one or more entries of a document with one or more tags based on the concepts to produce a tagged document, and
   generating, by the computer processor, an instance document from the tagged document, the instance document including code corresponding to the tagged one or more entries of the document;
   a document validation system that validates the generated instance document and generates a status indication corresponding to the code included in the instance document;

a validation report processing module that associates the status indication with a specific source among the one or more tagged entries of the document according to the generated instance document; and a user interface module that identifies and facilitates editing the specific source among the one or more tagged entries of the document.

2. The document preparation system of claim 1, wherein the document validation system comprises an interface to an external validation system, and the external validation system validates the generated instance document and generates validation errors and warnings corresponding to the code via the interface to the external validation system.

3. The document preparation system of claim 2, wherein:
the interface to the external validation system generates a data file including the code and navigation keys, each of the navigation keys associating a specific segment of the code with one or more specific sources among the one or more tagged entries of the document, and the validation report processing module uses the navigation keys to associate at least one of the generated validation errors and warnings with the specific source among the one or more tagged entries of the document.

4. The document preparation system of claim 3, wherein, the navigation keys of the data file further associate a specific segment of the code with one or more specific sources among the one or more taxonomies.

5. The document preparation system of claim 4, wherein the user interface module identifies and facilitates editing the specific source by navigating the one or more taxonomies having specific one or more concepts associated with the status indication.

6. The document preparation system of claim 2, wherein the interface to the external validation system communicates with the external validation system over a computer communication network.

7. The document preparation system of claim 2, wherein the interface to the external validation system comprises a data store accessible by both the document preparation system and the external validation system.

8. The document preparation system of claim 1, wherein the user interface facilitates navigation of the document to identify and edit the specific source among the one or more tagged entries of the document via an outline.

9. The document preparation system of claim 1, wherein the user interface facilitates navigation of the document to identify and edit the specific source among the one or more tagged entries of the document via autoscrolling the document to the one or more tagged entries.

10. A document preparation system comprising:
a computer processor;
a taxonomy module including one or more taxonomies having one or more concepts;
a document editor module that facilitates:
tagging of one or more entries of a document with one or more tags based on the concepts to produce a tagged document, and generating, by the computer processor, an instance document from the tagged document, the instance document including code corresponding to the tagged one or more entries of the document;

a document validation system that includes an interface to an external validation system that validates the generated instance document and generates a status indication corresponding to the code included in the instance document via the interface to the external validation system, the interface to the external validation system generating a data file including the code and navigation keys, each of the navigation keys associating a specific segment of the code with one or more specific sources among the one or more tagged entries of the document;

a validation report processing module that associates at least one of the generated validation error and warning with a specific source among the one or more tagged entries of the document using the navigation keys; and a user interface module that identifies and facilitates editing the specific source among the one or more tagged entries of the document and facilitates navigation of the document to identify and edit the specific source among the one or more tagged entries of the document via an outline.

11. A method of document preparation comprising:
tagging, by a computer, one or more entries of a document with one or more tags based on one or more concepts of one or more taxonomies to produce a tagged document;

generating, by a computer, an instance document from the tagged document, the instance document including code corresponding to the tagged one or more entries of the document;

executing, by a computer, an validation system to validate the generated instance document and generate a status indicator corresponding to the code included in the instance document;

processing, by a computer, to associate the status indicator with a specific source among the one or more tagged entries of the document according to the generated instance document; and identifying and facilitating editing, by a computer, the specific source among the one or more tagged entries of the document.

12. The method of claim 11, wherein executing the document validation system comprises executing an interface to an external validation system and receiving from the external validation system results from the external validation system's validation of the generated instance document including the generated status indicator corresponding to the code via the interface to the external validation system.

13. The method of claim 12, wherein:
executing the interface to the external validation system comprises generating a data file including the code and navigation keys, each of the navigation keys associating a specific segment of the code with one or more specific sources among the one or more tagged entries of the document, and the method further comprises associating the status indicator with the specific source among the one or more tagged entries of the document using the navigation keys.

14. The method of claim 13, wherein the navigation keys of the data file further associate a specific segment of the code with one or more specific sources among the one or more taxonomies.

15. The method of claim 14, wherein identifying and facilitating editing the specific source comprises navigating the one or more taxonomies having specific one or more concepts associated with the status indicator.

16. The method of claim 12, wherein executing the interface to the external validation system and receiving from the external validation system validation results comprises communicating with the external validation system over a computer communication network.

17. The method of claim 12, wherein executing the interface to the external validation system and receiving from the external validation system validation results comprises both the document preparation system and the external validation system accessing a commonly accessible data store.

18. The method of claim 11, wherein identifying and facilitating editing the specific source comprises navigating the document to identify and edit the specific source among the one or more tagged entries of the document via an outline.

19. The method of claim 11, wherein identifying and facilitating editing the specific source comprises navigating the document to identify and edit the specific source among the one or more tagged entries of the document via auto-scrolling the document to the one or more tagged entries.

20. A non-transitory computer readable storage medium having stored thereon a computer program executable by a computer processor for performing a method of document preparation, the method comprising:

tagging, by a computer, one or more entries of a document with one or more tags based on one or more concepts of one or more taxonomies to produce a tagged document;

generating, by a computer, an instance document from the tagged document, the instance document including code corresponding to the tagged one or more entries of the document;

executing, by a computer, a validation system to validate the generated instance document and generate a status indicator corresponding to the code included in the instance document;

processing, by a computer, to associate the status indicator with a specific source among the one or more tagged entries of the document according to the generated instance document; and identifying and facilitating editing, by a computer, the specific source among the one or more tagged entries of the document.

* * * * *